United States Patent
Park et al.

(10) Patent No.: US 10,132,976 B2
(45) Date of Patent: Nov. 20, 2018

(54) POLARIZING PLATE, METHOD FOR MANUFACTURING SAME, AND IMAGE DISPLAY DEVICE COMPRISING SAME

(71) Applicant: LG CHEM, LTD., Seoul (KR)

(72) Inventors: Kwang-Seung Park, Daejeon (KR); Hae-Sung Cho, Daejeon (KR); Hyun-Hee Son, Daejeon (KR); Kyun-Il Rah, Daejeon (KR); Jun-Wuk Park, Daejeon (KR); Eun-Soo Huh, Daejeon (KR); Mi-Rin Lee, Daejeon (KR); Sung-Hyun Jeon, Daejeon (KR)

(73) Assignee: LG Chem, Ltd., Seoul (KR)

( * ) Notice: Subject to any disclaimer, the term of this patent is extended or adjusted under 35 U.S.C. 154(b) by 285 days.

(21) Appl. No.: 15/025,506

(22) PCT Filed: Sep. 24, 2014

(86) PCT No.: PCT/KR2014/008900
§ 371 (c)(1),
(2) Date: Mar. 28, 2016

(87) PCT Pub. No.: WO2015/046879
PCT Pub. Date: Apr. 2, 2015

(65) Prior Publication Data
US 2016/0238767 A1 Aug. 18, 2016

(30) Foreign Application Priority Data

Sep. 30, 2013 (KR) .................. 10-2013-0117073
Sep. 23, 2014 (KR) .................. 10-2014-0126745

(51) Int. Cl.
*G02B 5/30* (2006.01)
*G02B 1/14* (2015.01)
(Continued)

(52) U.S. Cl.
CPC ........ *G02B 5/305* (2013.01); *B29D 11/00644* (2013.01); *G02B 1/14* (2015.01);
(Continued)

(58) Field of Classification Search
CPC ...... G02B 5/30; G02B 5/3025; G02B 5/3033; G02B 5/3041; G02B 5/305; G02B 1/10;
(Continued)

(56) References Cited

U.S. PATENT DOCUMENTS 4,684,671 A * 8/1987 Tsuchiya .............. C08G 59/687
430/280.1
2007/0212498 A1* 9/2007 Fukushige ............... C08J 3/243
428/1.31
(Continued)

FOREIGN PATENT DOCUMENTS

JP 2010-286737 A 12/2010
JP 2013-035968 A 2/2013
(Continued)

*Primary Examiner* — Stephone B Allen
*Assistant Examiner* — Adam W Booher
(74) *Attorney, Agent, or Firm* — Dentons US LLP

(57) ABSTRACT

The present invention relates to a polarizing plate including: a polarizer; a first protective layer formed on at least one surface of the polarizer; and a second protective layer formed on a surface opposite to a surface adjacent to a polarizer of the first protective layer, in which the first protective layer is a cured product of a radical curable composition, and the second protective layer is a cured product of a cationic curable composition, a manufacturing method thereof, and an image display device including the same.

17 Claims, 1 Drawing Sheet

(51) Int. Cl.
*B29D 11/00* (2006.01)
*B29C 47/00* (2006.01)
*B29C 55/14* (2006.01)
*B29K 33/00* (2006.01)
*B29K 79/00* (2006.01)
*B29K 105/00* (2006.01)
*B29L 7/00* (2006.01)

(52) U.S. Cl.
CPC ...... *B29C 47/0004* (2013.01); *B29C 47/0021* (2013.01); *B29C 47/0057* (2013.01); *B29C 55/143* (2013.01); *B29K 2033/12* (2013.01); *B29K 2079/085* (2013.01); *B29K 2105/0067* (2013.01); *B29K 2105/0088* (2013.01); *B29L 2007/008* (2013.01)

(58) Field of Classification Search
CPC . G02B 1/105; G02B 1/12; G02B 1/14; B29D 11/00644; B29C 47/0004; B29C 47/0021; B29C 47/0057; B29C 55/143; B29K 2033/12; B29K 2079/085; B29K 2105/0067; B29K 2105/0088; B29L 2007/008

See application file for complete search history.

(56) References Cited

U.S. PATENT DOCUMENTS

| 2008/0113119 | A1 | 5/2008 | Tsujiuchi et al. | |
|---|---|---|---|---|
| 2011/0268978 | A1* | 11/2011 | Watanabe | C08K 5/3475 428/500 |
| 2015/0099127 | A1* | 4/2015 | Ogawa | C09J 4/00 428/414 |

FOREIGN PATENT DOCUMENTS

| KR | 2012-0015780 A | 2/2010 |
|---|---|---|
| KR | 2010-0030586 A | 3/2010 |
| TW | 201015127 A | 4/2010 |

\* cited by examiner

[Figure 1]
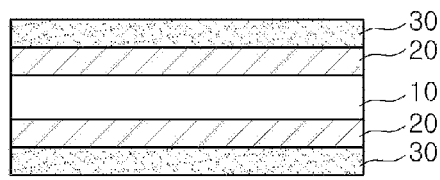
[Figure 2]
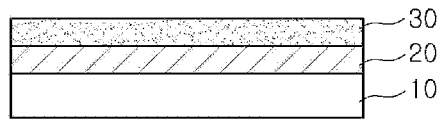
[Figure 3]
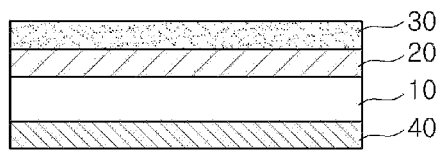

POLARIZING PLATE, METHOD FOR MANUFACTURING SAME, AND IMAGE DISPLAY DEVICE COMPRISING SAME

This application is a National Stage Application of International Application No. PCT/KR2014/008900, filed on Sep. 24, 2014, which claims the benefit of Korean Patent Application No. 10-2013-0117073 filed on Sep. 30, 2013 and Korean Patent Application No. 10-2014-0126745 filed on Sep. 23, 2014, all of which are hereby incorporated by reference in their entirety for all purposes as if fully set forth herein.

TECHNICAL FIELD

The present invention relates to a polarizing plate, a manufacturing method thereof, and a image display device including the same, and more particularly, to a polarizing plate in which two or more protective layers are formed on at least one surface of a polarizer, a manufacturing method thereof, and an image display device including the same.

BACKGROUND ART

A polarizing plate has been usually used in a structure, in which a protective film is stacked on both surfaces of a polarizer formed of a polyvinyl alcohol (hereinafter, referred to as 'PVA')-based resin dyed with a dichroic dye or iodine. In this case, a triacetyl cellulose (TAC)-based film has been frequently used as the protective film because the film is excellent in optical transparency or moisture permeability.

Meanwhile, as a liquid crystal display device has recently been developed into a mobile device such as a laptop personal computer, a cellular phone and a car navigation system, it is required that a polarizing plate which constitutes a liquid crystal display device is thin and lightweight. However, in a polarizing plate in which a TAC film and the like are laminated as the protective film as described above, it is difficult to maintain a thickness of the protective film at 20 μm or less from the viewpoint of handling property or durability performance during the operation, so that there is a limitation for the liquid crystal device to be thin and lightweight.

In order to solve the aforementioned problems, a technology has been suggested, in which a transparent thin film layer is formed by coating an active energy ray curable composition on at least one surface of a polarizer. In this case, the active energy ray curable composition which has been suggested may be classified into a radical curable composition and a cationic curable composition according to the curing method.

Meanwhile, when a transparent thin film layer is formed using a cationic curable composition, the transparent thin film layer is advantageous in that excellent adhesion with the polarizer is achieved and water resistance is excellent, but has a structural problem in that it is difficult to secure a uniform degree of curing according to the thickness direction by limitations of a cationic curing method in which the curing rate is slow and the degree of curing is poor, and accordingly, a desired thickness of the transparent protective layer may not be secured.

In contrast, when a transparent thin film layer is formed using a radical curable composition, the transparent thin film layer is advantageous in that there is no problem about the curing non-uniformity in a thickness up to about 100 μm because the curing rate is fast and the degree of curing is excellent, but has a problem in that a hydrophilic functional group generally included for adhesion of a radical curable composition with a PVA device is exposed to the outermost surface of the transparent protective layer and becomes very vulnerable to water resistance, and accordingly, discoloration of the polarizer and the like may occur.

In order to solve the problems, a polarizing plate having a two layer-type transparent thin film layer has been suggested by forming a transparent thin film layer on a polarizer using a cationic curable composition, and forming a transparent thin film layer again using a radical curable composition on the transparent thin film layer formed. Meanwhile, in this case, since the first layer is a cured product of the cationic curable composition, and thus blocks the polarizer through a covalent bond, it is possible to prevent the polarizer from being discolored in a moisture-resistant environment, but the second layer, which is a cured product of a radical curable composition generally including a hydrophilic functional group, is externally exposed to the outermost layer, and thus becomes exposed to moisture, thereby being easily peeled off with the first layer.

Therefore, there is a need for a new polarizing plate, which may form a protective layer in a desired thickness and simultaneously secure excellent water resistance, may significantly reduce the curling generation rate, and may be manufactured as a thin type as compared to a polarizing plate having a transparent protective film in the related art.

DISCLOSURE

Technical Problem

The present invention has been made in an effort to provide a polarizing plate, which may form a protective layer in a desired thickness and simultaneously secure excellent water resistance, may significantly reduce the curling generation rate, and may be manufactured as a thin type as compared to a polarizing plate having a transparent protective film in the related art, a manufacturing method thereof, and an image display device including the same.

Technical Solution

In one aspect, the present invention provides a polarizing plate including: a polarizer; a first protective layer formed on at least one surface of the polarizer; and a second protective layer formed on a surface opposite to a surface adjacent to a polarizer of the first protective layer, in which the first protective layer is a cured product of a radical curable composition, and the second protective layer is a cured product of a cationic curable composition.

Meanwhile, the radical curable composition has an average functional group equivalent weight of preferably 120 g/eq to 350 g/eq.

Meanwhile, it is preferred that the radical curable composition has a curing shrinkage ratio of 5% to 15% at 25% at 25° C.

Meanwhile, it is preferred that the radical curable composition includes: (A) a radical polymerizable compound including at least one hydroxy group in a molecule thereof; (B) a radical polymerizable compound including at least one carboxyl group in a molecule thereof; and (C) a radical polymerization initiator.

In this case, it is more preferred that the radical curable composition includes 40 to 80 parts by weight of (A) the radical curable compound; 15 to 50 parts by weight of (B) the radical polymerizable compound; and 0.5 to 10 parts by weight of the radical polymerization initiator, based on 100 parts by weight of the radical curable composition.

Meanwhile, it is preferred that the cationic curable composition includes: (a) a cationic polymerizable compound including (a) a cationic polymerizable compound including at least one epoxy group in a molecule thereof; and (b) a cationic polymerization initiator.

In this case, it is more preferred that (a) the cationic polymerizable compound is a combination of a first epoxy compound including at least one epoxidized aliphatic ring in a molecule thereof; and a second epoxy compound including at least one glycidyl ether group in a molecule thereof.

Meanwhile, it is particularly preferred that the weight ratio of the first epoxy compound including at least one epoxidized aliphatic ring in a molecule thereof to the second epoxy compound including at least one glycidyl ether group in a molecule thereof is 1:1 to 3:1.

Meanwhile, the cationic curable composition may further include (c) a cationic polymerizable compound including at least one oxetane group in a molecule thereof.

Meanwhile, it is preferred that the first protective layer has a thickness of 1 to 15 μm.

Further, it is preferred that the modulus of the first protective layer at 25° C. is 500 MPa to 5,000 MPa.

In addition, it is preferred that the second protective layer has a thickness of 0.1 to 10 μm.

Meanwhile, in the polarizing plate of the present invention, a protective film may be further attached, through an adhesive layer, to a surface opposite to a surface on which a protective layer of the polarizer is formed previously.

Furthermore, the polarizing plate of the present invention may further include an adhesion layer at the upper portion of the second protective layer of the polarizing plate.

Meanwhile, the present invention also provides an image display device including the polarizing plate.

In another aspect, the present invention also provides a method for manufacturing a polarizing plate, including: applying a radical curable composition on at least one surface; forming a first protective layer by irradiating an active energy ray on the applied radical curable composition to cure the radical curable composition by radical polymerization; applying a cationic curable composition on a surface opposite to a surface adjacent to a polarizer of the first protective layer; and forming a second protective layer by irradiating an active energy ray on the first protective layer and the cationic curable composition applied thereon to cure both the first protective layer and the cationic curable composition.

Advantageous Effects

Since the polarizing plate of the present invention uses a radical curable layer as a first protective layer, and the radical curable layer rarely has a problem about the curing non-uniformity of the film according to the thickness, there is an advantage in that the protective layer may be formed in a desired thickness, the radical curable layer is formed at the inner side of the protective layer as described above, and accordingly, there is an advantage in that curling generation rate may be significantly reduced.

Further, the polarizing plate of the present invention has an advantage in that a cationic curable layer is used as a second protective layer, and the radical curable layer may be protected with a cationic curable layer as described above, and accordingly, excellent water resistance may be secured.

In addition, the polarizing plate of the present invention has a protective layer having a small thickness as compared to a polarizing plate having a transparent protective film in the related art, and thus has an advantage in that the polarizing plate may be manufactured as a thin-type.

DESCRIPTION OF DRAWINGS

FIG. 1 is a cross-sectional view illustrating an example of a polarizing plate according to the present invention.

FIG. 2 is a cross-sectional view illustrating another example of a polarizing plate according to the present invention.

FIG. 3 is a cross-sectional view illustrating still another example of a polarizing plate according to the present invention.

MODE FOR INVENTION

Hereinafter, preferred exemplary embodiments of the present invention will be described. However, the exemplary embodiments of the present invention may be modified in various forms, and the scope of the present invention is not limited to the exemplary embodiments which will be described below. Further, exemplary embodiments of the present invention are provided to more completely explain the present invention to a person with ordinary skill in the art.

1. Polarizing Plate

As a result of repeated studies, the present inventors have found that when a cationic curable composition is formed as a first protective layer on a polarizer and a cured product of a radical curable composition is formed as a second protective layer on the first protective layer, excellent water resistance may be simultaneously secured while the protective layer may be formed in a desired thickness, and curling generation rate may be significantly reduced, thereby completing the present invention.

That is, the polarizing plate of the present invention includes: a polarizer; a first protective layer formed on at least one surface of the polarizer; and a second protective layer formed on a surface opposite to a surface of the first protective layer adjacent to the polarizer, in which the first protective layer is a cured product of a radical curable composition, and the second protective layer is a cured product of a cationic curable composition.

1-1. Polarizer

First, as the polarizer of the present invention, it is possible to use a polarizer well known in the art, for example, a polyvinyl alcohol (PVA)-based film in which iodine or a dichroic dye is adsorbed and oriented. In this case, a method for preparing a polyvinyl alcohol-based film is not particularly limited, and for example, a polyvinyl alcohol-based film may be prepared by performing stretching, dyeing, cross-linking, complementary color treatment and the like. Meanwhile, in the present specification, the polarizer refers to a state in which the polarizer does not include a protective layer (or a protective film), and the polarizing plate refers to a state in which the polarizing plate includes a polarizer and a protective layer (or a protective film).

Meanwhile, the polyvinyl alcohol-based film may be used without particular limitation as long as the film includes a polyvinyl alcohol resin or a derivative thereof. In this case, examples of the derivative of the polyvinyl alcohol resin include, but are not limited to, a polyvinyl formal resin, a polyvinyl acetal resin and the like. Also, as the polyvinyl alcohol-based film, it is also possible to use a commercially available polyvinyl alcohol-based film generally used in the manufacture of a polarizer in the art, for example, P30, PE30 and PE60 manufactured by Kuraray Co., Ltd., and M2000, M3000 and M6000 manufactured by Nippon Synthetic Chemical Industry Co., Ltd., and the like.

Meanwhile, the degree of polymerization of the polyvinyl alcohol-based film may be in a range of 1,000 to 10,000, preferably, in a range of 1,500 to 5,000, but is not limited thereto. This is because when the degree of polymerization satisfies the range, molecules freely move, and may be flexibly mixed with iodine or a dichroic dye, and the like.

1-2. First Protective Layer

Next, the first protective layer of the present invention is formed on at least one surface of a polarizer in order to allow the entire thickness of the protective layer to be formed in a desired dimension, and the first protective layer may be formed by methods well known in the art. For example, the protective layer may be formed by applying the radical curable composition on one surface of a polarizer to form a protective layer by a coating method well known in the art, for example, a method such as spin coating, bar coating, roll coating, gravure coating and blade coating, and then a method of curing the protective layer through irradiation of an active energy ray such as UV-ray, visible light and electron beam X-ray. In this case, the method of irradiating an active energy ray is not particularly limited, and for example, the curing may be performed by a method of irradiating UV-ray at about 10 to 2,500 mJ/cm2 using a UV-ray irradiation device (fusion lamp, D bulb).

Meanwhile, it is preferred that the radical curable composition includes a radical curable compound including at least one hydrophilic functional group in a molecule thereof and a radical polymerization initiator. This is because excellent adhesion between the polarizer and the first protective layer may be secured through a hydrogen bond between a hydrophilic functional group (generally, a hydroxy group) and the hydrophilic functional group of the first protective layer after curing. In this case, the radical polymerizable compound including at least one hydrophilic functional group in a molecule thereof may be included either alone or in mixtures of two or more thereof in the radical curable composition.

In this case, the radical polymerizable compound including at least one hydrophilic functional group in a molecule thereof included in the radical curable composition according to the present invention may have at least one hydrophilic functional group in a molecule to implement adhesion through a hydrogen bond, and may be used without particular limitation as long as the presence of an unsaturated double bond between carbons in a molecule thereof may achieve the radical polymerization. In this case, the hydrophilic functional group is not particularly limited as long as the hydrophilic functional group may obtain a hydrogen bond, such as a hydroxy group, a carboxyl group, an urethane group, an amine group, and an amide group, but among them, particularly, a hydroxy group or a carboxyl group is more preferred for implementing excellent adhesion with the polarizer.

More specifically, it is preferred that the radical curable composition includes: (A) a radical polymerizable compound including at least one hydroxy group in a molecule thereof; (B) a radical polymerizable compound including at least one carboxyl group in a molecule thereof; and (C) a radical polymerization initiator.

More particularly, the radical curable composition includes 40 to 80 parts by weight of (A) the radical curable compound; 15 to 50 parts by weight of (B) the radical polymerizable compound; and 0.5 to 10 parts by weight of (C) the radical polymerization initiator, based on 100 parts by weight of the radical curable composition.

In this case, (A) the radical polymerizable compound is a component for implementing excellent adhesion, and in the present invention, various compounds represented by the following [Formula 1] may be used as (A) the radical polymerizable compound, but (A) the radical polymerizable compound is not limited thereto.

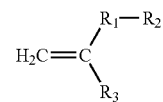

[Formula I]

In [Formula I], $R_1$ is an ether group (—O—), an ester group (—COO—), an amide group (—CON—), or a thioate group (—COS—); $R_2$ is a $C_{1-10}$ alkyl group, a $C_{4-10}$ cycloalkyl group, or a combination thereof, and in this case, $R_2$ has at least one hydroxy substituent in a molecule thereof; and $R_3$ is hydrogen, or a substituted or unsubstituted $C_{1-10}$ alkyl group.

In this case, in $R_2$, the alkyl group refers to a straight-chained or branch-chained hydrocarbon moiety having 1 to 10, or 1 to 8, or 1 to 4 carbon atoms, and the alkyl group in the present specification may also include at least one unsaturated bond in a molecule thereof. Meanwhile, examples of the alkyl group include, but are not limited to, methyl, ethyl, propyl, butyl, pentyl, hexyl, heptyl, octyl, nonyl, decanyl and the like.

Furthermore, in $R_2$, the cycloalkyl group refers to a non-aromatic monocyclic, bicyclic or tricyclic hydrocarbon moiety of 4 to 14, or 4 to 10, or 4 to 6 ring carbons, and the cycloalkyl group in the present specification may also include at least one unsaturated bond in a molecule thereof. Meanwhile, examples of the cycloalkyl group include, but are not limited to, a cyclopentane ring, a cyclohexane ring and the like.

Meanwhile, the hydroxy group may be substituted at any position in an alkyl group or a cycloalkyl group. For example, the hydroxy group may be present at a terminal of an alkyl group, or at the middle of an alkyl group. Meanwhile, the other hydrogen atoms included in the alkyl group or the cycloalkyl group may be substituted with any substituent.

Further, in $R_3$, the alkyl group refers to a straight-chained or branch-chained hydrocarbon moiety having 1 to 10, or 1 to 8, or 1 to 4 carbon atoms, and the alkyl group in the present specification may also include at least one unsaturated bond in a molecule thereof. Meanwhile, examples of the alkyl group include, but are not limited to, methyl, ethyl, propyl, butyl, pentyl, hexyl, heptyl, octyl, nonyl, decanyl and the like. One or more hydrogen atoms included in the alkyl group may be substituted with any substituent.

More specifically, (A) the radical polymerizable compound may be, but is not limited to, for example, a compound represented by the following [Formula 1] to [Formula 13].

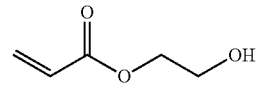

[Formula 1]

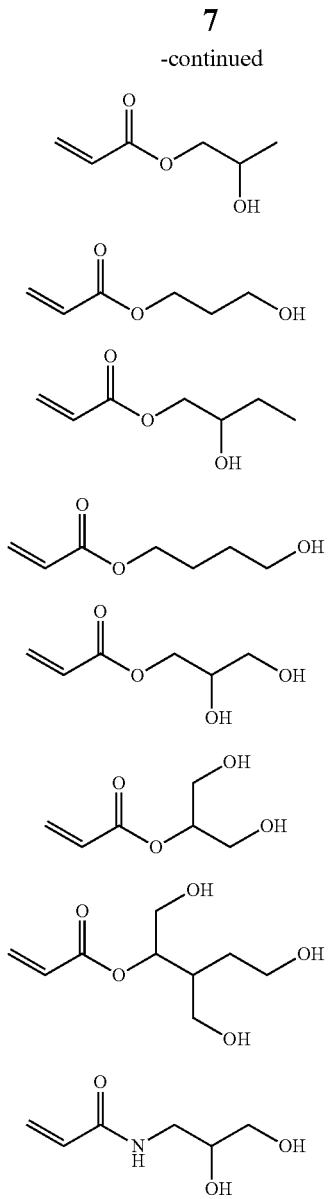

[Formula 2]

[Formula 3]

[Formula 4]

[Formula 5]

[Formula 6]

[Formula 7]

[Formula 8]

[Formula 9]

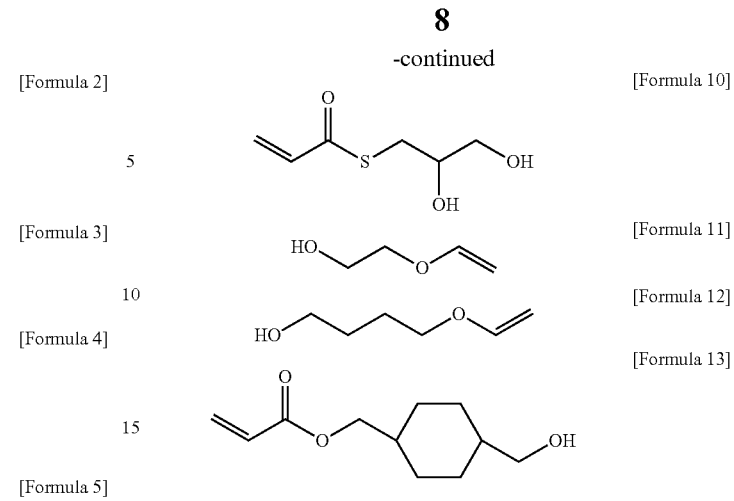

[Formula 10]

[Formula 11]

[Formula 12]

[Formula 13]

Meanwhile, (A) the radical polymerizable compound may be present in an amount of 40 to 80 parts by weight, 50 to 80 parts by weight, or 50 to 70 parts by weight, based on 100 parts by weight of the entire radical curable composition. In this case, there is an advantage in that stable adhesion may be secured even under a high humidity environment.

Next, (B) the radical polymerizable compound is a component for further enhancing heat resistance, viscosity characteristics and the like as well as water resistance, but is not limited to, various compounds having an acid value in a range of 100 to 1,000 mg·KOH/g. In this case, the glass transition temperature may be increased while adhesion does not particularly deteriorate, thereby obtaining a radical curable composition having excellent heat resistance. Meanwhile, the acid value refers to the number of mg of KOH required to completely neutralize 1 g of a sample, and the measuring method is not particularly limited. For example, the hydroxy value in a sample may be calculated through the following Equation (1).

(molecular weight of KOH×number of —OH in a sample×1,000)/molecular weight of the sample   Equation (1):

More specifically, examples of (B) the radical polymerizable compound include, but are not limited to, a compound represented by the following [Formula 14] to [Formula 28].

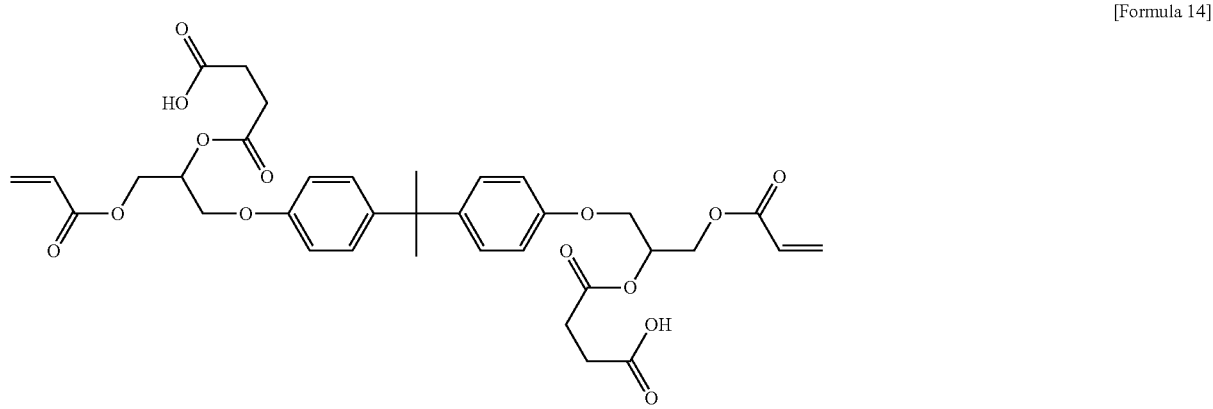

[Formula 14]

[Formula 15]
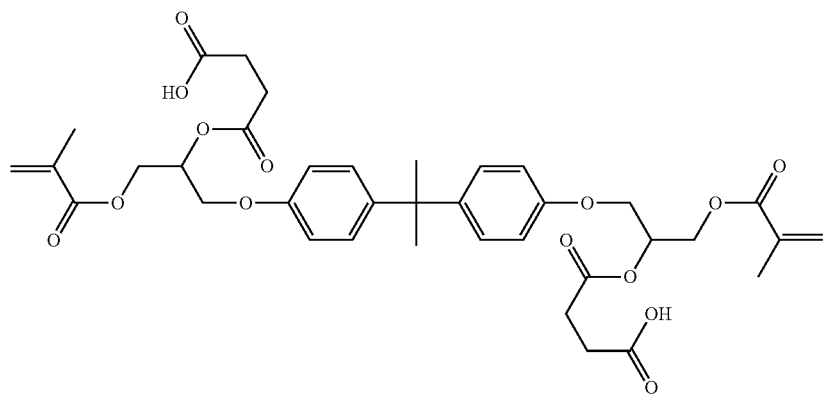
[Formula 16]
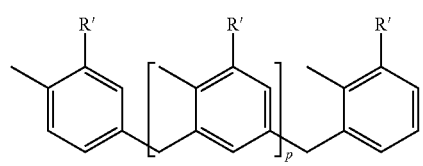
(Here, R' is
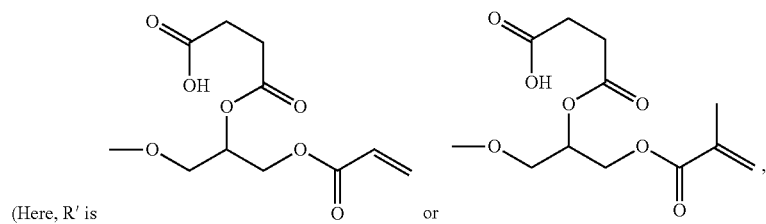 or
and p is an integer of 1 to 5)
[Formula 17]
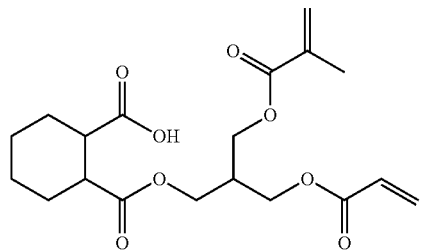
[Formula 18]
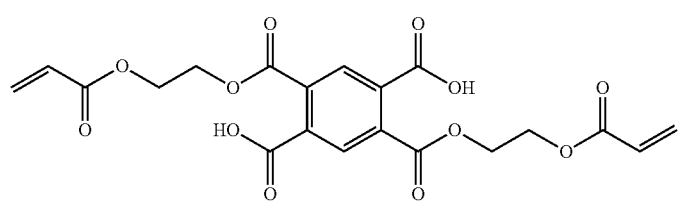

-continued
[Formula 19]
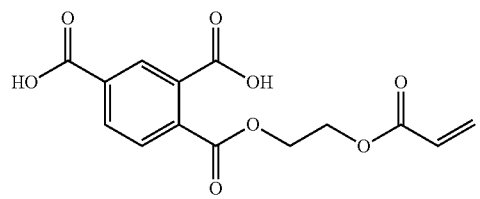
[Formula 20]
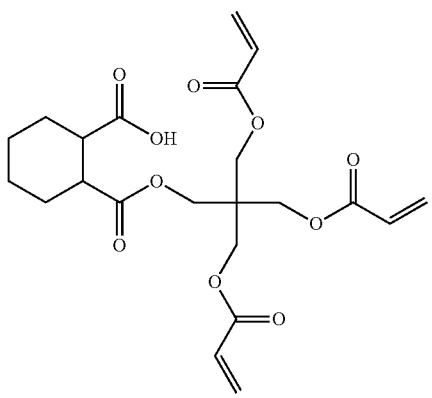
[Formula 21]
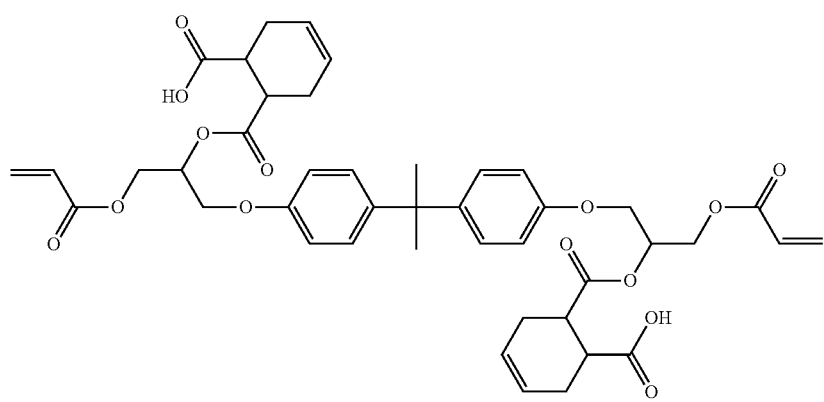
[Formula 22]
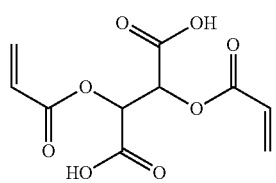
[Formula 23]
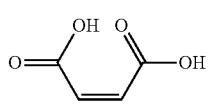
[Formula 24]
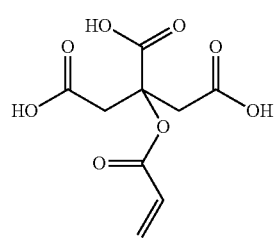
[Formula 25]
[Formula 26]
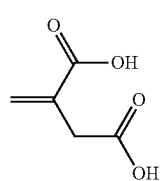
[Formula 27]
[Formula 28]
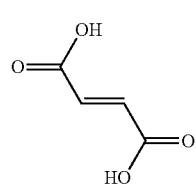

Meanwhile, (B) the radical polymerizable compound may be present in an amount of 15 to 50 parts by weight, 20 to 50 parts by weight, or 20 to 40 parts by weight, based on 100 parts by weight of the entire radical curable composition. In this case, there is an advantage in that particularly, both adhesion and heat resistance of the polarizer are excellent.

Next, (C) the radical polymerization initiator is for promoting the radical polymerizability to enhance the curing rate, and as the radical polymerization initiator, radical polymerization initiators generally used in the art may be used without limitation.

More specifically, the radical polymerization initiator may be, for example, one or more selected from the group consisting of 1-hydroxy-cyclohexyl-phenyl-ketone, 2-hydroxy-2-methyl-1-phenyl-1-propanone, 2-hydroxy-1-[4-(2-hydroxyethoxy)phenyl]-2-methyl-1-propanone, methylbenzoylformate, oxy-phenyl-acetic acid-2-[2 oxo-2-phenyl-acetoxy-ethoxy]-ethyl ester, oxy-phenyl-acetic acid-2-[2-hydroxy-ethoxy]-ethyl ester, alpha-dimethoxy-alpha-phenylacetophenone, 2-benzyl-2-(dimethylamino)-1-[4-(4-morpholinyl)phenyl]-1-butanone, 2-methyl-1-[4-(methylthio)phenyl]-2-(4-morpholinyl)-1-propanone, diphenyl (2,4,6-trimethylbenzoyl)-phosphine oxide, phosphine oxide, and phenylbis(2,4,6-trimethylbenzoyl)-phosphineoxide. Particularly in the present invention, phenylbis (2,4,6-trimethylbenzoyl)-phosphineoxide may be preferably used.

Meanwhile, (C) the radical polymerization initiator may be present in an amount of 0.5 to 10 parts by weight, 1 to 5 parts by weight, or 2 to 3 parts by weight, based on 100 parts by weight of the entire radical curable composition. In this case, particularly, the radical curable composition may be smoothly cured.

Meanwhile, the radical curable composition of the present invention may additionally include (D) a (meth)acrylic compound including a ring structure of 7 to 20 carbon atoms, preferably 7 to 15 carbon atoms.

More specifically, (D) the (meth)acrylic compound may be, for example, one or more selected from the group consisting of isobornyl (meth)acrylate, norbornyl (meth)acrylate, dicyclopentanyl (meth)acrylate, dicyclopentenyl (meth)acrylate and 1-adamantyl-(meth)acrylate, but is not limited thereto.

Meanwhile, (D) the (meth)acrylic compound may be present in an amount of 50 parts by weight or less, 50 parts by weight or less, for example, 1 to 50 parts by weight, or 5 to 50 parts by weight, based on 100 parts by weight of the entire radical curable composition. In this case, particularly, both the viscosity and glass transition temperature after curing of the radical curable composition are excellent.

More specifically, it is preferred that the radical curable composition of the present invention includes 40 to 80 parts by weight of (A) the radical curable composition; 15 to 50 parts by weight of (B) the radical curable composition; 0.5 to 10 parts by weight of (C) the radical initiator; and 1 to 50 parts by weight of (D) the (meth)acrylic compound, based on 100 parts by weight of the entire radical curable composition.

Meanwhile, the radical curable composition of the present invention may additionally include a photosensitizer, an antistatic agent, an antioxidant, a photostabilizer, an UV absorbent, a leveling agent and the like, if necessary. In this case, the photosensitizer, the antistatic agent, the antioxidant, the photostabilizer, the UV absorbent, the leveling agent and the like which may be used in the present invention are not particularly limited, and a publicly known material well known in the art may be used without limitation.

Meanwhile, the average equivalent weight of the functional group of the radical curable composition is preferably 120 g/eq to 350 g/eq, and may be, for example, 150 g/eq to 300 g/eq or 160 g/eq to 300 g/eq. According to the studies of the inventors of the present invention, when the average functional group equivalent weight of the radical curable composition for forming a first protective layer satisfies the range, the radical curable composition has low curing shrinkage ratio, and thus has an advantage in that the curling characteristics are very excellent even though the polarizing plate to be manufactured has two or more protective layers. In contrast to this, when the average functional group equivalent weight exceeds the range, for example, when a polyfunctional (meth)acrylic compound such as pentaerythritol triacrylate is added as a main component in order to enhance hardness of a film, there is a problem in that curls of the polarizing plate are severely generated when two or more layers of the protective layer are formed because the curing shrinkage ratio is increased. Meanwhile, the average functional group equivalent weight may be calculated by a method including: each calculating a value obtained by multiplying the functional group equivalent weight of each component included in the radical curable composition by the percentage weight ratio of the component, and adding these values. For example, when the radical curable composition includes the three components of A, B and C, the average functional group equivalent weight may be calculated through the following Equation (2). The following Equation (2) denotes the calculation method in the case of arbitrarily having the three components, but it will be obvious whether the calculation method varies according to the number of components included in the radical curable composition.

Average functional group equivalent weight=[(molecular weight of Component $A$/number of functional groups per mole of Component $A$)*percentage weight ratio of Component $A$]+ [(molecular weight of Component $B$/number of functional groups per mole of Component $B$)*percentage weight ratio of Component $B$]+ [(molecular weight of Component $C$/number of functional groups per mole of Component $C$)*percentage weight ratio of Component $C$]     Equation (2):

Further, the curing shrinkage ratio of the radical curable composition is preferably 5% to 15% at 25° C., and may be, for example, 5% to 10%, or 10% to 15%. According to the studies of the inventors of the present invention, when the curing shrinkage ratio of the radical curable composition for forming a first protective layer satisfies the range, there is an advantage in that the polarizing plate to be manufactured has particularly excellent curling characteristics. In this case, the curing shrinkage ratio refers to a rate of change in volume of the radical curable composition for forming a protective layer after curing compared to the volume of the radical curable composition before curing, and may be calculated through the following Equation (3).

Curing shrinkage ratio (%)=$\{(V_i-V_f)/V_i\}\cdot 100=\{((m/\rho_i)-V_f)/(m/\rho_i)\}\cdot 100$     Equation (3):

In Equation (3), $V_i$, $V_f$, m and $\rho_i$ refer to the volume of the composition before curing, the volume of the composition after curing, the mass of the composition, and the density of the composition before curing, respectively.

In addition, the total acid value of the radical curable composition is preferably 30 to 300 mg·KOH/g, and may be, for example, 30 to 100 mg·KOH/g, or 100 to 300 mg·KOH/g. In this case, the glass transition temperature of the composition may be simultaneously enhanced while maintaining excellent adhesion of the polarizer, thereby enhancing heat resistance.

Furthermore, the glass transition temperature of the radical curable composition after curing is preferably 70° C. to 500° C., and may be, for example, 80° C. to 300° C., or 90° C. to 200° C. When the radical curable composition has a glass transition temperature in the numerical range as described above, the protective layer may have excellent heat resistance and water resistance.

Further, the viscosity of the radical curable composition is preferably 10 to 300 cP, and may be, for example, 20 to 100 cP. When the viscosity of the composition satisfies the numerical range, there is an advantage in that workability is excellent because the protective layer may be thinly formed, and has a low viscosity.

Meanwhile, the thickness of the first protective layer of the present invention is preferably 1 to 15 μm, and more preferably 1 to 10 μm, or 1 to 5 μm. In order to secure thermal impact properties of the polarizing plate according to the present invention, the modulus of the first protective layer needs to be designed to be large. In this case, the modulus of the first protective layer varies according to the thickness of the first protective layer, and when the thickness of the first protective layer satisfies the numerical range, there is an advantage in that the size of the modulus of the first protective layer is increased, and accordingly, it is easy to secure thermal impact properties of the polarizing plate.

In addition, the modulus of the first protective layer of the present invention at normal temperature (25° C.), and may be, for example, 1,000 MPa to 4,000 MPa. When the modulus of the first protective layer satisfies the numerical range, there is an advantage in that the polarizing plate of the present invention, which includes the same may secure much better thermal impact properties. In this case, the modulus refers to a value obtained by fixing both ends of a sample prepared in accordance with the standard of JIS-K6251-1, applying force to a direction vertical to the thickness direction thereof, and measuring stress per unit area according to the strain, and in this case, for example, a 2010 UTM machine manufactured by Zwick/Roell 2010 UTM and the like may be used as a measuring apparatus.

1-3. Second Protective Layer

Next, the second protective layer of the present invention is formed on a surface opposite to a surface adjacent to a polarizer of the first protective layer in order to secure excellent water resistance by protecting the first protective layer under a high humidity environment, and the second protective layer may also be formed by a method well known in the art. For example, the second protective layer may be formed by applying the cationic curable composition on at least one surface of the first protective layer by a coating method well known in the art, for example, a method such as spin coating, bar coating, roll coating, gravure coating and blade coating to form a protective layer, and then a method of curing the protective layer through irradiation of an active energy ray such as UV-ray, visible light, electron beam X-ray and X-ray. In this case, the method of irradiating an active energy ray is not particularly limited, either, and for example, the irradiation may be performed by a method of irradiating UV-ray at about 10 to 2,500 mJ/cm2 using a UV-ray irradiation device (fusion lamp, D bulb).

Meanwhile, it is preferred that the cationic curable composition includes: (a) a cationic polymerizable compound including at least one epoxy group in a molecule thereof; and (b) a cationic polymerization initiator. This is because the hydrophilic functional group of the first protective layer and the epoxy group may be reacted with each other during the cationic curing process to form a covalent bond by a ring opening reaction, thereby securing excellent adhesion between the first protective layer and the second protective layer, and furthermore, securing excellent water resistance. In this case, the cationic polymerizable compound including at least one epoxy group in a molecule thereof may be included either alone or in mixtures of two or more thereof in the cationic curable composition.

In this case, (a) the cationic polymerizable compound may be used without particular limitation as long as the compound has at least one epoxy group in a molecule thereof to enable adhesion to be implemented through a covalent bond with the first protective layer, and furthermore, enables cations to be polymerized through the epoxy group. However, it is more preferred in order to implement excellent adhesion hardness with the first protective layer that the cationic polymerizable compound including at least one epoxy group in a molecule thereof includes at least two epoxy groups in a molecule thereof.

For example, in the present invention, examples of (a) the cationic polymerizable compound include, but are not limited to, an aromatic epoxy-based compound, a hydrogenated epoxy-based compound, an alicyclic epoxy-based compound, an aliphatic epoxy-based compound, and the like.

In this case, the aromatic epoxy-based compound refers to an epoxy-based compound including at least one aromatic hydrocarbon ring in a molecule thereof, and examples thereof include, but are not limited to, a bisphenol-type epoxy resin such as diglycidyl ether of bisphenol A, diglycidyl ether of bisphenol F, and diglycidyl ether of bisphenol S; a novolac-type epoxy resin such as a phenol novolac epoxy resin, a cresol novolac epoxy resin, and a hydroxybenzaldehyde phenol novolac epoxy resin; a polyfunctional epoxy resin such as a glycidyl ether of tetrahydroxy phenylmethane, a glycidyl ether of tetrahydroxy benzophenone, and epoxidized polyvinylphenol, and the like.

Further, the hydrogenated epoxy-based compound refers to an epoxy-based compound obtained by selectively subjecting the aromatic epoxy-based compound to a hydrogenation reaction under pressure in the presence of a catalyst, and is not limited thereto, but among them, it is preferred that diglycidyl ether of hydrogenated bisphenol A is particularly used.

In addition, the alicyclic epoxy-based compound refers to an epoxy-based compound in which an epoxy group is formed between two adjacent carbon atoms which constitute an aliphatic hydrocarbon ring, and examples thereof include, but are not limited to, 2-(3,4-epoxy)cyclohexyl-5,5-spiro-(3,4-epoxy)cyclohexane-m-dioxane, 3,4-epoxycyclohexyl-methyl-3,4-epoxycyclohexanecarboxylate, 3,4-epoxy-6-methylcyclohexylmethyl-3,4-epoxy-6-methylcyclohexanecarboxylate, vinylcyclohexane dioxide, bis(3,4-epoxycyclohexylmethyl)adipate, bis(3,4-epoxy-6-methylcyclohexylmethyl)adipate, exo-exo bis(2,3-epoxycyclopentyl)ether, endo-exo bis(2,3-epoxycyclopentyl)ether, 2,2-bis[4-(2,3-epoxypropoxy)cyclohexyl]propane, 2,6-bis (2,3-epoxypropoxycyclohexyl-p-dioxane), 2,6-bis(2,3-epoxypropoxy)norbornene, limonene dioxide, 2,2-bis(3,4-epoxycyclohexyl)propane, dicyclopentadiene dioxide, 1,2-epoxy-6-(2,3-epoxypropoxy)hexahydro-4,7-methanoindane, p-(2,3-epoxy)cyclopentyl phenyl-2,3-epoxypropyl ether, 1-(2,3-epoxypropoxy)phenyl-5,6-epoxyhexahydro-4,7-methanoindane, o-(2,3-epoxy) cyclopentyl phenyl-2,3-epoxypropyl ether), 1,2-bis[5-(1,2- epoxy)-4,7-hexahydro methanoindanoxyl]ethane cyclopentyl phenyl glycidyl ether, methylenebis(3,4-epoxycyclohexane)ethylene glycol di(3,4-epoxycyclohexylmethyl) ether, ethylenebis(3,4-epoxycyclohexanecarboxylate), an esterification compound of an c-caprolactone (1 to 10 mole) adduct of 3,4-epoxy cyclohexane methanol and a polyhydric (3 to 20 values) alcohol (GR, TMP, PE, DPE and hexapentaerythritol), and the like. Among them, from the viewpoint of reactivity, it is preferred that particularly 3,4-epoxycyclohexylmethyl-3,4-epoxycyclohexane carboxylate is used.

Meanwhile, it is particularly preferred that (a) the cationic polymerizable compound is not limited to, but a combination of a first epoxy compound including at least one epoxidized aliphatic ring group, that is, an alicyclic epoxy ring in a molecule thereof; and a second epoxy compound including at least one glycidyl ether group in a molecule thereof is used.

When the combination of a first epoxy compound and a second epoxy compound is used as described above, it is possible to form a protective layer with improved thermal impact properties, and in this case, the first epoxy compound and the second epoxy compound are used in combination at a weight ratio of preferably 1:1 to 3:1, more preferably 1:1 to 2:1, and most preferably 1:1. When the weight ratio of the first epoxy compound and the second epoxy compound satisfies the range, most preferred physical properties may be obtained in terms of glass transition temperature, adhesive strength and viscosity.

The first epoxy compound may be, for example, at least one selected from the group consisting of 3,4-epoxycyclohexylmethyl-3,4'-epoxycyclohexane carboxylate, bis(3,4-epoxycyclomethyl)adipate dicyclopentadiene dioxide, limonene dioxide, and 4-vinylcyclohexene dioxide. The first epoxy compound is for increasing the glass transition temperature and imparting hardness to an adhesive layer, and may be most preferably 3,4-epoxycyclohexylmethyl-3,4'-epoxycyclohexane carboxylate.

The second epoxy compound is not particularly limited as long as the compound includes one or more glycidyl ether groups, and may be, for example, one or more selected from the group consisting of 1,4-cyclohexanedimethanol diglycidyl ether, a novolac epoxy, a bisphenol A-based epoxy, a bisphenol F-based epoxy, a brominated bisphenol-based epoxy, 1,6-hexanediol diglycidyl ether, trimethylolpropane triglycidyl ether, n-butyl glycidyl ether, aliphatic glycidyl ether ($C_{12}$ to $C_{14}$), 2-ethylhexyl glycidyl ether, phenyl glycidyl ether, o-cresyl glycidyl ether, and nonyl phenyl glycidyl ether. The second epoxy compound is a compound which imparts softness to enhance the adhesive strength, is more preferably a compound including an aliphatic ring, and may be most preferably 1,4-cyclohexanedimethanol diglycidyl ether.

Meanwhile, the content of (a) the cationic polymerization initiator is 5 to 90 parts by weight, and preferably 10 to 90 parts by weight, based on 100 parts by weight of the entire cationic curable composition.

Next, (b) the cationic polymerization initiator is a compound which produces a cationic species or a Lewis acid by the irradiation of an active energy ray, and refers to a compound which acts on a cationic polymerizable group such as an epoxy group to initiate a cationic polymerization reaction. In this case, as the cationic polymerization initiator, cationic polymerization initiators generally used in the art may be used without limitation. For example, as the cationic polymerization initiator, an initiator including a sulfonium salt or an iodonium salt may be preferably used.

Specific examples of the cationic polymerization initiator including the sulfonium salt or the iodonium salt include, for example, one or more selected from the group consisting of diphenyl(4-phenylthio)phenylsulfonium hexafluoroantimonate, diphenyl(4-phenylthio)phenylsulfonium hexafluorophosphate, (phenyl)[4-(2-methylpropyl)phenyl]-iodonium hexafluorophosphate, (thiodi-4,1-phenylene)bis(diphenylsulfonium)dihexafluoroantimonate, and (thiodi-4,1-phenylene)bis(diphenylsulfonium) dihexafluorophosphate, but are not limited thereto.

Meanwhile, the content of (b) the cationic polymerization initiator is 0.5 to 20 parts by weight, preferably 0.5 to 15 parts by weight, and more preferably 0.5 to 10 parts by weight, based on 100 parts by weight of the entire cationic curable composition.

Meanwhile, the cationic curable composition of the present invention may further include (c) a cationic polymerizable compound including at least one oxetane group in a molecule thereof. In this case, the viscosity of the cationic curable composition may be lowered, and the curing rate may be further enhanced. In this case, (c) the cationic curable compound may be used without particular limitation as long as the compound has at least one oxetane group in a molecule thereof to enable cationic polymerization.

More specifically, examples of (c) the cationic polymerizable compound include 3-ethyl-3-[(3-ethyloxetane-3-yl) methoxymethyl]oxetane, 1,4-bis[(3-ethyloxetane-3-yl) methoxymethyl]benzene, 1,4-bis[(3-ethyloxetane-3-yl) methoxy]benzene, 1,3-bis[(3-ethyloxetane-3-yl)methoxy] benzene, 1,2-bis[(3-ethyloxetane-3-yl)methoxy]benzene, 4,4'-bis[(3-ethyloxetane-3-yl)methoxy]biphenyl, 2,2'-bis [(3-ethyloxetane-3-yl)methoxy]biphenyl, 3,3',5,5'-tetramethyl-4,4'-bis[(3-ethyloxetane-3-yl)methoxy]biphenyl, 2,7-bis[(3-ethyloxetane-3-yl)methoxy]naphthalene, bis{4-[(3-ethyloxetane-3-yl)methoxy]phenyl}methane, bis{2-[(3-ethyloxetane-3-yl)methoxy]phenyl}methane, 2,2-bis{4-[(3-ethyloxetane-3-yl)methoxy]phenyl}propane, etherification-modified products of novolac-type phenol-formaldehyde resins with 3-chloromethyl-3-ethyloxetane, etherified modified compound of a, 3(4),8(9)-bis[(3-ethyloxetane-3-yl) methoxymethyl]-tricyclo[5.2.1.0 2,6]decane, 2,3-bis[(3-ethyloxetane-3-yl)methoxymethyl]norbornane, 1,1,1-tris[(3-ethyloxetane-3-yl)methoxymethyl]propane, 1-butoxy-2,2-bis[(3-ethyloxetane-3-yl)methoxymethyl]butane, 1,2-bis{ [2-(3-ethyloxetane-3-yl)methoxy]ethylthio}ethane, bis{[4-(3-ethyloxetane-3-yl)methylthio]phenyl}sulfide, 1,6-bis[(3-ethyloxetane-3-yl)methoxy]-2,2,3,3,4,4,5,5-octafluorohexane, and the like.

Meanwhile, the content of (c) the cationic polymerizable compound is 5 to 90 parts by weight, and preferably 10 to 90 parts by weight, based on 100 parts by weight of the entire cationic curable composition.

Meanwhile, the cationic curable composition of the present invention may further include (a) a vinyl-based compound together with the components, if necessary, and in this case, there is an advantage in that it is favorable to maintain the viscosity at a low level, and that it is possible to prevent a phenomenon in which the glass transition temperature after curing is decreased. In this case, as (d) the vinyl-based compound, a hydroxy $C_{1-6}$ alkylvinyl ether and/or vinyl acetate may be used, and the hydroxy $C_{1-6}$ alkylvinyl ether may be at least one selected from the group consisting of hydroxyethyl vinyl ether, hydroxybutyl vinyl ether, 1,4-cyclohexandedimethanol vinyl ether, 4-(hydroxymethyl)cyclohexylmethyl vinyl ether, ethylene glycol vinyl ether, and diethyelene glycol monovinyl ether. Meanwhile, (d) the vinyl-based compound may be included in an amount of 0.1 to 10 parts by weight, or 0.1 to 5 parts by weight based on 100 parts by weight of the entire cationic curable composition.

Furthermore, the cationic curable composition of the present invention may further include (e) a silane coupling agent together with the components, if necessary, and in this case, an effect of lowering the surface energy of the protective layer to enhance the wetting. In this case, it is more preferred that (e) the silane coupling agent includes a cationic polymerizable functional group such as an epoxy group, a vinyl group and a radical group. The present inventors have found that when a silane coupling agent including the cationic polymerizable functional group is used, the wetting may be improved while the glass transition temperature of the adhesive does not deteriorate, unlike the case of using a silane coupling agent which does not include a surfactant or a cationic polymerizable functional group. This is thought to be because a phenomenon in which the glass transition temperature of the adhesive layer after curing is reduced while the cationic polymerizable functional group of the silane coupling agent is reacting with the silane group of the adhesive composition to form a cross-linked form. Meanwhile, the cationic curable composition may include the silane compound at a ratio of 0.1 to 10 parts by weight, or 0.1 to 5 parts by weight with respect to 100 parts by weight of the entire composition. In the range, the protective layer may exhibit appropriate surface energy and adhesion.

Further, the cationic curable composition of the present invention may additionally include (f) a radical polymerizable monomer together with the components, if necessary. The radical polymerizable monomer may be used without limitation as long as the monomer is any of the compounds having a radical reactive functional group, and it is possible to use, for example, (meth)acrylates having one or more (meth)acryloyl groups in a molecule thereof, (meth)acrylamides, maleimides, (meth)acrylic acid, maleic acid, itaconic acid, (meth)acrylaldehyde, (meth)acryloyl morpholine, N-vinyl-2-pyrrolidone, triallylisocyanurate and the like. Meanwhile, the content of (f) the radical polymerizable monomer is 0 to 40 parts by weight, preferably 5 to 30 parts by weight, and more preferably 5 to 25 parts by weight, based on 100 parts by weight of the entire composition.

Meanwhile, when the cationic curable composition includes (f) the radical polymerizable monomer as described above, it is preferred that a radical polymerization initiator is together blended for promoting the radical polymerizability to enhance the curing rate, and the radical polymerization initiator is the same as described above. The content of the radical polymerization initiator is 0.5 to 20 parts by weight, preferably 0.5 to 15 parts by weight, and more preferably 0.5 to 10 parts by weight, based on 100 parts by weight of the entire composition.

Meanwhile, the cationic curable composition of the present invention may also additionally include a photosensitizer, an antistatic agent, an antioxidant, a photostabilizer, an UV absorbent, a leveling agent and the like, if necessary. In this case, the photosensitizer, the antistatic agent, the antioxidant, the photostabilizer, the UV absorbent, the leveling agent and the like which may be used in the present invention are not particularly limited, and a publicly known material well known in the art may be used without limitation.

In addition, the cationic curable composition of the present invention may also additionally include a particulate, if necessary. In this case, anti-glare property may be imparted to the second protective layer. In this case, the particulate which may be used is not particularly limited, and it is possible to use, for example, an inorganic particulate such as silica, titania, and alumina, or an organic particulate such as a silicone-based resin, a fluorine-based resin, and a (meth)acrylic resin.

Meanwhile, the glass transition temperature of the cationic curable composition after curing is preferably 80° C. or more, and may be, for example, 80° C. to 110° C. Since excellent heat resistance may be obtained in this case, the polarizer may be prevented from being broken when heat resistance durability and thermal impact property are evaluated.

Furthermore, it is preferred that the cationic curable composition has a viscosity of 15 to 200 cp, and in this case, there is an advantage in that workability is excellent because the protective layer may be thinly formed, and has a low viscosity.

Further, when a polarizing plate manufactured using the cationic curable composition is immersed in water at a temperature of 60° C. for 24 hours, it is preferred that the polarizer discoloration proceeds over a length of less than 10 mm in the MD direction, which indicates excellent water resistance.

Meanwhile, the thickness of the second protective layer of the present invention is preferably 0.1 to 10 μm, and more preferably 1 to 10 μm, or 1 to 5 μm. When the thickness of the second protective layer satisfies the numerical range, there is an advantage in that curing uniformity and thickness uniformity are enhanced.

1-4. Other Configurations

Meanwhile, the polarizing plate of the present invention may further include a protective film on one surface of the polarizer, if necessary. More specifically, in the polarizing plate of the present invention, a first protective layer (20) and a second protective layer (30) may be formed on both surfaces of a polarizer (10), as illustrated in the following FIG. 1, or a first protective layer (20) and a second protective layer (30) may be formed on only one surface of a polarizer (10), as illustrated in the following FIG. 2, and when the first protective layer (20) and the second protective layer (30) are formed on only one surface of the polarizer (10) as illustrated in the following FIG. 3, a separate protective film (40) may be attached to a surface opposite to a surface on which the protective layers (20 and 30) are formed in order to support and protect the polarizer.

In this case, the protective film is provided for supporting and protecting a polarizer, and it is possible to use protective films formed of various materials generally known in the art, for example, a cellulose-based film, a polyethylene terephthalate (PET) film, a cycloolefin polymer (COP) film, an acrylic film and the like without limitation. Among them, it is particularly preferred that an acrylic film is used in consideration of optical properties, durability, economic efficiency and the like. The method of attaching the protective film is not particularly limited, and the protective film may be attached by a method generally used in the art, for example, through a publicly known adhesive layer.

Meanwhile, the polarizing plate of the present invention may also include a phase difference film for compensating the optical phase difference generated in a liquid crystal cell, if necessary. In this case, the phase difference film may be included whiled being attached on the second protective layer. In this case, the phase difference film which may be used in the present invention is not particularly limited, and a phase difference film generally used in the art may be used according to various liquid crystal modes of a liquid crystal display device. The method of attaching the phase difference film is not particularly limited, and the phase difference film may be attached by a method generally used in the art.

Meanwhile, the polarizing plate of the present invention may include an adhesion layer at the upper portion of the protective layer, if necessary, for attachment to an optical film such as a display device panel. In this case, the adhesion layer may be formed by using various gluing agents well known in the art, and the kind thereof is not particularly limited. For example, the adhesion layer may be formed by using a rubber-based gluing agent, an acrylic gluing agent, a silicone-based gluing agent, a urethane-based gluing agent, a polyvinyl alcohol-based gluing agent, a polyvinyl pyrrolidone-based gluing agent, a polyacryl amide-based gluing agent, a cellulose-based gluing agent, a vinyl alkyl ether-based gluing agent and the like. Among them, it is particularly preferred that an acrylic gluing agent is used in consideration of transparency, heat resistance and the like. Meanwhile, the adhesion layer may be formed by a method of applying a gluing agent at the upper portion of the protective layer, and may also be formed by a method of attaching an adhesion sheet, which is manufactured by applying a gluing agent on a release sheet, and then drying the gluing agent, at the upper portion of the protective layer.

2. Method of Manufacturing Polarizing Plate

Next, the method of manufacturing a polarizing plate of the present invention as described above will be described more specifically.

The method for manufacturing a polarizing plate of the present invention is characterized to include: applying a radical curable composition on at least one surface of a polarizer; forming a first protective layer by irradiating an active energy ray on the applied radical curable composition to cure the radical curable composition by radical polymerization; applying a cationic curable composition on a surface opposite to a surface adjacent to a polarizer of the first protective layer; and forming a second protective layer by irradiating an active energy ray on the first protective layer and the cationic curable composition applied thereon to cure both the first protective layer and the cationic curable composition.

2-1. Applying Radical Curable Composition

First, the method of applying the radical curable composition on at least one surface of the polarizer, and for example, the application may be performed by applying a radical curable composition on at least one surface of the polarizer by coating methods well known in the art, for example, a method such as spin coating, bar coating, roll coating, gravure coating, and blade coating, and then by a method of drying the composition, if necessary. Also, the application may also be performed by applying the radical curable composition on a transparent substrate film such as a polyethyleneterephthalate film, a polycarbonate film, a triacetylcellulose film, a norbornene-based film, a polyester-based film and a polystyrene film by the aforementioned coating method, and then drying the composition, if necessary, and a method of bonding the applied radical curable composition to at least one surface of the polarizer such that the applied radical curable composition becomes a bonded surface. In this case, an active energy ray is irradiated thereon, and then the substrate film is removed.

2-2. Forming First Protective Layer

When the radical curable composition is applied on at least one surface of the polarizer, a first protective layer is formed by irradiating an active energy ray thereon to cure the radical curable composition by radical polymerization. In this case, the active energy ray includes UV ray, electron beam, microwaves, infrared ray (IR), X-ray and gamma-ray as well as particle beam such as alpha-particle beam, proton beam and neutron beam, and UV ray or electron ray and the like may be usually used.

In this case, the light quantity of the active energy ray irradiated on the adhesive layer may be 500 mJ/cm$^2$ to 3,000 mJ/cm$^2$, and the irradiation time may be 0.1 s to 20 s. When the light quantity and irradiation time of the active energy ray satisfy the numerical ranges, the productivity is excellent because the curing rate of the adhesive is fast, and external appearance characteristics and optical characteristics of the film do not deteriorate.

2-3. Applying Cationic Curable Composition

When a first protective layer is formed, a cationic curable composition is applied on a surface opposite to a surface adjacent to the polarizer of the first coating layer. The method of applying the cationic curable composition is not also particularly limited, and for example, the application may be performed by applying a cationic curable composition on a first coating layer by coating methods well known in the art, for example, a method such as spin coating, bar coating, roll coating, gravure coating, and blade coating, and then by a method of drying the composition, if necessary. Also, the application may also be performed by applying the cationic curable composition on a transparent substrate film such as a polyethyleneterephthalate film, a polycarbonate film, a triacetylcellulose film, a norbornene-based film, a polyester-based film and a polystyrene film by the aforementioned coating method, and then drying the composition, if necessary, and a method of adhering the applied cationic curable composition to the first protective layer such that the applied cationic curable composition becomes an adhered surface. In this case, an active energy ray is irradiated thereon, and then the substrate film is removed.

2-2. Forming Second Protective Layer

When the cationic curable composition is applied on a surface opposite to a surface adjacent to the polarizer of the first protective layer, a second protective layer is formed by irradiating an active energy ray on the first protective layer and the cationic curable composition applied thereon to simultaneously cure both the first protective layer and the cationic curable composition by cationic polymerization. In this case, the active energy ray is the same as that as described above in the part of forming the first protective layer.

In the case of the present invention, as described above, it is preferred that the radical curable composition includes a radical curable compound including at least one hydrophilic functional group in a molecule thereof, and that the cationic curable composition includes a cationic polymerizable compound including at least one epoxy group in a molecule thereof, and in this case, when an active energy ray is irradiated on the first protective layer and the cationic curable composition applied thereon to simultaneously cure both the first protective layer and the cationic curable composition by cationic polymerization as described above, the hydrophilic functional group of the first protective layer is reacted with the epoxy group of the cationic polymerizable compound including an epoxy group to form a covalent bond, and accordingly, the first protective layer and the second protective layer are allowed to have excellent adhesion.

3. Image Display Device

The aforementioned polarizing plate of the present invention may be usefully applied to an image display device. The image display device may be, for example, a liquid crystal display device including a liquid crystal panel and polarizing plates each provided on both surfaces of the liquid crystal panel, and in this case, at least one of the polarizing plates may be the polarizing plate according to the present invention.

In this case, the kind of liquid crystal panel included in the liquid crystal display device is not particularly limited. For example, it is possible to apply all the publicly known panels such as a passive matrix type panel such as a twisted nematic (TN)-type, a super twisted nematic (STN)-type, a ferroelectric (F)-type, or a polymer dispersed (PD)-type; an active matrix type panel such as a two-terminal or three-terminal; an in plane switching (IPS) panel and a vertical alignment (VA) panel without being limited to the kind thereof. Furthermore, the kinds of other configurations which constitute the liquid crystal display device, for example, the kinds of upper and lower substrates (e.g., a color filter substrate, or an array substrate) and the like are not particularly limited, and the configuration publicly known in the field may be adopted without limitation. Meanwhile, the method of attaching the polarizing plate is not particularly limited, and the polarizing plate may be attached by a method generally used in the art.

BEST MODE

Hereinafter, the present invention will be described in more detail with reference to specific Examples.

Preparation Example 1—Manufacture of Acrylic Protective Film

A raw material pellet was manufactured by supplying a resin composition, in which poly(N-cyclohexylmaleimide-co-methylmethacrylate), a styrene-maleic anhydride copolymer resin and a phenoxy-based resin were uniformly mixed with each other at a weight ratio of 100:2.5:5, to a 24Φ extruder in which a portion from a raw material hopper to the extruder was substituted with nitrogen, and melting the mixed resin composition at 250° C.

PKFE (Mw=60,000, Mn=16,000, Tg=95° C.) manufactured by InChemRez® Co., Ltd., was used as the phenoxy-based resin, Dylaeck 332 with a content of 85 wt % of styrene and 15 wt % of anhydrous maleic anhydride was used as the styrene-maleic anhydride copolymer resin, and as the poly(N-cyclohexylmaleimide-co-methylmethacrylate) resin, a resin with a content of 6.5 wt % of N-cyclohexylmaleimide as a result of NMR analysis was used.

The obtained raw material pellet was dried under vacuum, melted by the extruder at 260° C., allowed to pass through a coat hanger-type T-die, and allowed to pass through a chrome plating casting roll and a drying roll and the like to manufacture a film having a thickness of 150 μm. A pilot stretching device was used to stretch the film at a ratio of 170% in the MD direction at 125° C. by using the difference between speeds of the rolls, thereby manufacturing an acrylic film.

After the acrylic film manufactured by the aforementioned process was subjected to corona treatment, a primer composition, in which 20 parts by weight of an oxazoline crosslinking agent (Nippon Shokubai Co., Ltd., WS700) was added to a primer composition with a solid content of 10 wt % that is prepared by diluting CK-PUD-F (Chokwang urethane dispersion) with pure water, was coated on one surface of the acrylic film with a #7 bar, and then the acrylic film was stretched at a ratio of 190% in a TD direction at 130° C. using a tenter, thereby finally manufacturing an acrylic protective film having a primer layer thickness of 400 nm.

Preparation Example 2—Preparation of Composition for Protective Film (1) Radical Curable Composition A Composition A for a protective film was prepared by mixing 3 parts by weight of Irgacure 819 (radical initiator) with 67 parts by weight of 2-hydroxyethyl acrylate (Formula 1), 20 parts by weight of a carboxylated BPA-type dimethacrylate (Formula 15), and 10 parts by weight of itaconic acid (Formula 27), and then stirring the mixture at 60° C. for 4 hours.

(2) Radical Curable Composition B

Composition B for a protective film was prepared by mixing 3 parts by weight of Irgacure 819 (radical initiator) with 67 parts by weight of 4-hydroxybutyl acrylate (Formula 5), 20 parts by weight of a carboxylated BPA-type dimethacrylate (Formula 15), and 10 parts by weight of itaconic acid (Formula 27), and then stirring the mixture at 60° C. for 4 hours.

(3) Radical Curable Composition C

Composition C for a protective film was prepared by mixing 3 parts by weight of Irgacure 819 (radical initiator) with 67 parts by weight of hydroxyisopropyl acrylate (Formula 2), 20 parts by weight of a carboxylated BPA-type dimethacrylate (Formula 15), and 10 parts by weight of itaconic acid (Formula 27), and then stirring the mixture at 60° C. for 4 hours.

(4) Radical Curable Composition D

Composition D for a protective film was prepared by mixing 3 parts by weight of Irgacure 819 (radical initiator) with 67 parts by weight of 4-hydroxymethylcyclohexyl methacrylate (Formula 14), 20 parts by weight of a carboxylated BPA-type dimethacrylate (Formula 15), and 10 parts by weight of itaconic acid (Formula 27), and then stirring the mixture at 60° C. for 4 hours.

(5) Radical Curable Composition E

Composition E for a protective film was prepared by mixing 25 parts by weight of 3,4-epoxycyclohexanemethyl-3,4-epoxycyclohexyl carboxylate (Celoxide 2021P manufactured by Daicel Chemical Industries, Ltd., cas no. 2386-87-0), 25 parts by weight of cyclohexanedimethanol diglycidyl ether (cas no. 14228-73-0), 45 parts by weight of 3-ethyl-3-{[(3-ethyloxetane-3-yl)methoxy]methyl}oxetane (oxt-221 manufactured by Toagosei Co., Ltd., cas no. 18934-00-4), and 5 parts by weight of triarylsulfonium hexafluorophosphate (UVI-6992 manufactured by Dow Chemical Co.) and then heating the mixture at 60° C.

Experimental Example 1—Measurement of Average Functional Group Equivalent Weight The average functional group equivalent weights of Compositions A to E for a protective film were measured by the aforementioned calculation method, and are shown in the following [Table 1].

Experimental Example 2—Measurement of Curing Shrinkage Ratio

The curing shrinkage ratios of Compositions A to E for a protective film were measured, and are shown in the following [Table 1]. Specifically, the volume ($V_i$) of 1 g of each of Compositions A to E for a protective film at 25° C. was measured using an automatic gas pycnometer, the compositions were each applied on a release PET film, and then cured, and the resulting protective film was peeled off from the PET film, the volume ($V_f$) of the peeled-off protective film was measured using the automatic gas pycnometer, and then a curing shrinkage ratio was calculated using the above-described Equation (3).

Experimental Example 3—Measurement of Viscosity of Composition

The viscosity of each of Compositions A to E for a protective film was measured using Viscometer TV-22 (TOKI SANGYO), and is shown in the following [Table 1].

Experimental Example 4—Measurement of Glass Transition Temperature

The glass transition temperature after curing of each of Compositions A to E for a protective film was measured, and is shown in the following [Table 1]. Specifically, each of Compositions A to E for a protective film was cured, and then a thin section was taken for measurement by a differential scanning calorimetry (DCS) manufactured by Mettler Toledo Inc. For the measured temperature range, −30° C. to 200° C. was scanned two times at a rate of 10° C. per minute, and the measured glass transition temperature is a value of the glass transition temperature during the second scanning.

TABLE 1

| Composition | Average functional group equivalent weight [g/eq] | Curing shrinkage ratio [%] | Glass transition temperature [° C.] | Viscosity [cP] |
| --- | --- | --- | --- | --- |
| A | 169 | 13.5 | 91 | 38 |
| B | 187 | 14.2 | 82 | 42 |
| C | 178 | 12.9 | 96 | 39 |
| D | 225 | 11.8 | 93 | 44 |
| E | 92 | 8.7 | 104 | 24 |

Example 1

Radical curable composition A was applied on a primer layer of an acrylic film-based protective film prepared in Preparation Example 1 by using a dropper, and lamination was performed on one surface of a polarizer (PVA device), and then the film was allowed to pass through a laminator. Then, a polarizing plate including a protective film on one surface of a polarizer was manufactured by irradiating UV light with 500 to 1,000 mJ/cm² on a surface, on which the acrylic film was laminated, using a UV irradiation device (metal halide lamp).

Next, Radical curable composition A was applied on the other surface of the side on which the protective film of the polarizer of the polarizing plate manufactured above was laminated, a PET film having a release force was laminated, and then, the film was allowed to pass through a laminator. Then, a polarizing plate including a protective film on one surface of a polarizer and a radical cured layer on the other surface thereof was manufactured by irradiating UV light with 500 to 1,000 mJ/cm² on a surface, on which a release PET film was laminated, using a UV irradiation device (metal halide lamp), and removing the PET film.

Next, Radical curable composition E was applied on the other surface of the side which faces the polarizer of the radical cured layer of the polarizing plate manufactured above, a PET film having a release force was laminated, and then, the film was allowed to pass through a laminator. Then, a polarizing plate in which a cation cured layer (second protective layer) was formed on the radical cured layer (first protective layer) was manufactured by irradiating UV light with 500 to 1,000 mJ/cm² on a surface, on which a release PET film was laminated, using a UV irradiation device (metal halide lamp), and removing the PET film.

Example 2

A polarizing plate was manufactured in the same manner as in Example 1, except that Radical Curable Composition B was used instead of Radical Curable Composition A.

Example 3

A polarizing plate was manufactured in the same manner as in Example 1, except that Radical Curable Composition C was used instead of Radical Curable Composition A.

Example 4

A polarizing plate was manufactured in the same manner as in Example 1, except that Radical Curable Composition D was used instead of Radical Curable Composition A.

Comparative Example 1

Radical curable composition A was applied on a primer layer of an acrylic film-based protective film prepared in Preparation Example 1 by using a dropper, and lamination was performed on one surface of a polarizer (PVA device), and then the film was allowed to pass through a laminator. Then, a polarizing plate including a protective film on one surface of a polarizer was manufactured by irradiating UV light with 500 to 1,000 mJ/cm² on a surface, on which the acrylic film was laminated, using a UV irradiation device (metal halide lamp).

Next, Radical curable composition A was applied on the other surface of the side on which the protective film of the polarizer of the polarizing plate manufactured above was laminated, a PET film having a release force was laminated, and then, the film was allowed to pass through a laminator. Then, a polarizing plate including a protective film on one surface of a polarizer and a radical cured layer on the other surface thereof was manufactured by irradiating UV light with 500 to 1,000 mJ/cm² on a surface, on which a release PET film was laminated, using a UV irradiation device (metal halide lamp), and removing the PET film.

Comparative Example 2

Radical curable composition A was applied on a primer layer of an acrylic film-based protective film prepared in Preparation Example 1 by using a dropper, and lamination was performed on one surface of a polarizer (PVA device), and then the film was allowed to pass through a laminator. Then, a polarizing plate including a protective film on one surface of a polarizer was manufactured by irradiating UV light with 500 to 1,000 mJ/cm² on a surface, on which the acrylic film was laminated, using a UV irradiation device (metal halide lamp).

Next, Radical curable composition E was applied on the other surface of the side on which the protective film of the polarizer of the polarizing plate manufactured above was laminated, a PET film having a release force was laminated, and then, the film was allowed to pass through a laminator. Then, a polarizing plate including a protective film on one surface of a polarizer and a cation cured layer on the other surface thereof was manufactured by irradiating UV light with 500 to 1,000 mJ/cm² on a surface, on which a release PET film was laminated, using a UV irradiation device (metal halide lamp), and removing the PET film.

Comparative Example 3

Radical curable composition A was applied on a primer layer of an acrylic film-based protective film prepared in Preparation Example 1 by using a dropper, and lamination was performed on one surface of a polarizer (PVA device), and then the film was allowed to pass through a laminator. Then, a polarizing plate including a protective film on one surface of a polarizer was manufactured by irradiating UV light with 1,000 mJ/cm² on a surface, on which the acrylic film was laminated, using a UV irradiation device (metal halide lamp).

Next, Radical curable composition E was applied on the other surface of the side on which the protective film of the polarizer of the polarizing plate manufactured above was laminated, a PET film having a release force was laminated, and then, the film was allowed to pass through a laminator. Then, a polarizing plate including a protective film on one surface of a polarizer and a cation cured layer on the other surface thereof was manufactured by irradiating UV light with 500 to 1,000 mJ/cm² on a surface, on which a release PET film was laminated, using a UV irradiation device (metal halide lamp), and removing the PET film.

Next, Radical curable composition A was applied on the other surface of the side which faces the polarizer of the first protective layer of the polarizing plate manufactured above, a PET film having a release force was laminated, and then, the film was allowed to pass through a laminator. Then, a polarizing plate in which a radical cured layer (second protective layer) was formed on the cation cured layer (first protective layer) was manufactured by irradiating UV light with 500 to 1,000 mJ/cm² on a surface, on which a release PET film was laminated, using a UV irradiation device (metal halide lamp), and removing the PET film.

Experimental Example 5—Evaluation of Thermal Impact Properties

Thermal impact properties of the polarizing plates manufactured in Examples and Comparative Examples were measured, and are shown in the following [Table 2]. Specifically, the evaluation was performed by repeating 100 times a process of laminating the polarizing plates manufactured in Examples and Comparative Examples on a glass substrate, leaving the laminates to stand at −40° C. for 30 minutes, and then leaving the laminates to stand again at 80° C. for 30 minutes. Then, it was visually evaluated whether the external appearance of the polarizing plate changed. The cases, in which cracks with a size of 2 mm or less were generated only at the end portions, cracks with a short line shape of 5 mm or more were only confirmed at the portions other than the end portions, and a plurality of cracks was generated on the entire surface of the polarizing plate in the external appearance of the polarizing plate, were indicated as excellent, good, and bad, respectively.

Experimental Example 6—Evaluation of Water Resistance

Water resistance of the polarizing plates manufactured in Examples and Comparative Examples was measured, and is shown in the following [Table 2]. Specifically, the polarizing plates in Examples and Comparative Examples were laminated on a glass substrate, and then immersed in a thermostat at 60° C., and the water resistance was judged by observing whether the end portions of the polarizing plate had been discolored after 8 hours, and the cases in which no change was observed and discoloration occurred were indicated as excellent and bad, respectively.

Experimental Example 7—Evaluation of Curling Characteristics

Curling characteristics of the polarizing plates manufactured in Examples and Comparative Examples were measured, and are shown in the following [Table 2]. Specifically, the polarizing plates in Examples and Comparative Examples were cut into a size of 30 cm*30 cm, and then placed on a flat surface plate, and it was measured how high each corner had been curled up from the bottom.

Experimental Example 8—Evaluation of Adhesion of First Protective Layer

The adhesion of the second protective layers of the polarizing plates manufactured in Examples and Comparative Examples was measured, and is shown in the following [Table 1]. Specifically, the radical curable compositions used in Examples and Comparative Examples were applied at a thickness of 4 to 5 µm on a polarizer (PVA device), a polarizer (PVA device) was laminated thereon and allowed to pass through a laminator, and then a UV irradiation device (metal halide lamp) was used to irradiate UV rays thereon at 500 to 1,000 mJ/cm², thereby preparing a peel strength sample composed of a polarizer/a protective layer/a polarizer. The prepared sample was left to stand under conditions of a temperature of 20° C. and a humidity of 70% for 4 days, and then cut into a width of 20 mm and a length of 100 mm, and a texture analyzer device (TA-XT Plus manufactured by Stable Micro Systems Ltd.) was used to measure a peel strength at a speed of 300 m/min and an angle of 90 degrees. In this case, the sample was indicated as OK and NG when the peel strength thereof is 1.0 N/2 cm or more and less than 1.0 N/2 cm, respectively.

Experimental Example 9—Evaluation of Adhesion of Second Protective Layer

The adhesion of the second protective layers of the polarizing plates manufactured in Examples and Comparative Examples was measured, and is shown in the following [Table 2]. Specifically, the polarizing plates manufactured in Examples and Comparative Examples were adhered to glass using a gluing agent, and then 100 grids having each side of 1 mm were engraved on the surface of the second protective layer with a cutter knife, and a test of adhering cellophane tape thereto and then peeling off the grids was performed to calculate the number of the remaining grids without being peeled off. After the test, the sample was indicated OK and NG when all the 100 grids among the 100 grids were all right, and any one thereof was dropped, respectively.

TABLE 2

| Classification | Protective Layer | Thickness | Adhesion | Thermal Impact Properties | Water resistance | Curling characteristics |
|---|---|---|---|---|---|---|
| Example 1 | First protective layer (Composition A) | 6 μm | OK | OK | OK | <5 mm |
|  | Second protective layer (Composition E) | 6 μm | OK |  |  |  |
| Example 2 | First protective layer (Composition B) | 6 μm | OK | OK | OK | <5 mm |
|  | Second protective layer (Composition E) | 6 μm | OK |  |  |  |
| Example 3 | First protective layer (Composition C) | 6 μm | OK | OK | OK | <5 mm |
|  | Second protective layer (Composition E) | 6 μm | OK |  |  |  |
| Example 4 | First protective layer (Composition D) | 6 μm | OK | OK | OK | <5 mm |
|  | Second protective layer (Composition E) | 6 μm | OK |  |  |  |
| Comparative Example 1 | First protective layer (Composition A) | 12 μm | OK | OK | NG | 13 mm |
|  | Second protective layer (None) | — | — |  |  |  |
| Comparative Example 2 | First protective layer (Composition E) | 12 μm | NG | NG | OK | 7 mm |
|  | Second protective layer (None) | — | — |  |  |  |
| Comparative Example 3 | First protective layer (Composition E) | 6 μm | OK | OK | NG (Peeling-off of two layers) | <5 mm |
|  | Second protective layer (Composition A) | 6 μm | OK |  |  |  |

As can be seen in Table 2, it can be known that the polarizing plates of Examples 1 to 4 may be thinly manufactured because the protective layer thereof is thin, and furthermore, adhesion, thermal impact properties, water resistance and curling characteristics are all excellent.

On the contrary, it can be known that the polarizing plate of Comparative Example 1 which has only a radical cured layer as the protective layer has problems with water resistance and curling characteristics, and the polarizing plate of Comparative Example 2 which has only a cation cured layer as the protective layer has problems with adhesion, thermal impact properties and curling characteristics.

Further, it can be known that in the case of having a cation cured layer as the first protective layer and a radical cured layer as the second protective layer contrary to Examples 1 to 4, there is a problem in that the second layer had been peeled off as a result of the water resistance test.

Meanwhile, the adhesive layer and the first protective layer were manufactured using the same radical curable composition for convenience when the polarizing plate was manufactured, but the present invention is not limited thereto.

As described above, exemplary embodiments of the present invention have been described in detail, but it will be obvious to a person with ordinary skill in the art that the scope of the present invention is not limited thereto, and various modifications and changes can be made without departing from the technical spirit of the present invention described in the claims.

EXPLANATION OF REFERENCE NUMERALS AND SYMBOLS

10: Polarizer
20: First protective layer
30: Second protective layer
40: Protective film

The invention claimed is:

1. A polarizing plate comprising:
a polarizer;
a first protective layer formed on at least one surface of the polarizer, wherein the first protective layer is in direct contact with the polarizer; and
a second protective layer formed on a surface of the first protective layer opposite to a surface adjacent to the polarizer,
wherein the first protective layer is a cured product of a radical curable composition, and the second protective layer is a cured product of a cationic curable composition.

2. The polarizing plate of claim 1, wherein the radical curable composition has an average functional group equivalent weight of 120 g/eq to 350 g/eq.

3. The polarizing plate of claim 1, wherein the radical curable composition has a curing shrinkage ratio of 5% to 15% at 25° C.

4. The polarizing plate of claim 1, wherein the radical curable composition comprises: (A) a radical polymerizable compound comprising at least one hydroxy group in a molecule thereof; (B) a radical polymerizable compound comprising at least one carboxyl group in a molecule thereof; and (C) a radical polymerization initiator.

5. The polarizing plate of claim 4, wherein the radical curable composition comprises 40 to 80 parts by weight of (A) the radical curable compound; 15 to 50 parts by weight of (B) the radical polymerizable compound; and 0.5 to 10 parts by weight of (C) the radical polymerization initiator, based on 100 parts by weight of the radical curable composition.

6. The polarizing plate of claim 1, wherein the cationic curable composition comprises: (a) a cationic polymerizable compound comprising at least one epoxy group in a molecule thereof; and (b) a cationic polymerization initiator.

7. The polarizing plate of claim 6, wherein (a) the cationic polymerizable compound is a combination of a first epoxy compound comprising at least one epoxidized aliphatic ring in a molecule thereof; and a second epoxy compound comprising at least one glycidyl ether group in a molecule thereof.

8. The polarizing plate of claim 7, wherein a weight ratio of the first epoxy compound comprising at least one epoxidized aliphatic ring in a molecule thereof to the second epoxy compound comprising at least one glycidyl ether group in a molecule thereof is 1:1 to 3:1.

9. The polarizing plate of claim 6, wherein the cationic curable composition further comprises (c) a cationic polymerizable compound comprising at least one oxetane group in a molecule thereof.

10. The polarizing plate of claim 1, wherein the first protective layer has a thickness of 1 μm to 15 μm.

11. The polarizing plate of claim 1, wherein a modulus of the first protective layer at 25° C. is 500 MPa to 5,000 MPa.

12. The polarizing plate of claim 1, wherein the second protective layer has a thickness of 0.1 μm to 10 μm.

13. The polarizing plate of claim 1, wherein a protective film is further attached, through an adhesive layer, to a surface of the polarizer opposite to a surface on which the first protective layer and the second protective layer are formed.

14. The polarizing plate of claim 1, further comprising an adhesion layer at an upper portion of the second protective layer.

15. The polarizing plate of claim 1, wherein the polarizer is a polyvinyl alcohol-based film in which iodine or a dichroic dye is adsorbed and aligned.

16. An image display device comprising the polarizing plate of claim 1.

17. A method for manufacturing a polarizing plate by forming a first protective layer and a second protective layer in this sequence on at least one surface of a polarizer, the method comprising:
applying a radical curable composition on at least one surface of a polarizer;
forming a first protective layer by irradiating an active energy ray on the applied radical curable composition to cure the radical curable composition by radical polymerization;
applying a cationic curable composition on a surface of the first protective layer opposite to a surface adjacent to the polarizer; and
forming a second protective layer by irradiating an active energy ray on the first protective layer and the cationic curable composition applied thereon to cure both the first protective layer and the cationic curable composition by cationic polymerization.

* * * * *